No. 12,515.

REISSUED JULY 31, 1906.

O. BRIEDE.

FORGING MACHINE.

APPLICATION FILED MAY 17, 1904.

2 SHEETS—SHEET 1.

WITNESSES:

Herbert Bradley.

F. C. Gaither.

INVENTOR

Otto Briede, by Christy & Christy, Att'ys

No. 12,515. REISSUED JULY 31, 1906.

O. BRIEDE.

FORGING MACHINE.

APPLICATION FILED MAY 17, 1904.

2 SHEETS—SHEET 2.

WITNESSES:
Herbert Bradley.
F. C. Gaither.

INVENTOR
Otto Briede,
by Christy & Christy Att'ys

UNITED STATES PATENT OFFICE.

OTTO BRIEDE, OF BENRATH, NEAR DUSSELDORF, GERMANY.

FORGING-MACHINE.

No. 12,515. Specification of Reissued Letters Patent. Reissued July 31, 1906.

Original No. 741,301, dated October 13, 1903. Application for reissue filed May 17, 1904. Serial No. 208,394.

*To all whom it may concern:*

Be it known that I, OTTO BRIEDE, a subject of the King of Prussia, German Emperor, and a resident of Benrath, near Dusseldorf, in the Province of the Rhine, German Empire, have invented a new and Improved Forging-Machine, of which the following is an exact specification.

My invention relates to a new and improved forging-machine, by means of which any kind of figured bars or tubes can be manufactured.

My invention is represented in the accompanying drawings, in which—

Figure 2:
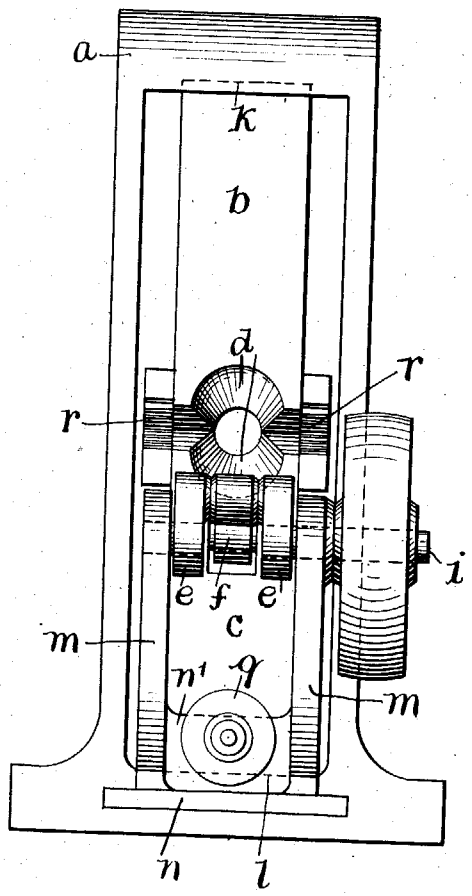
Figure 1:
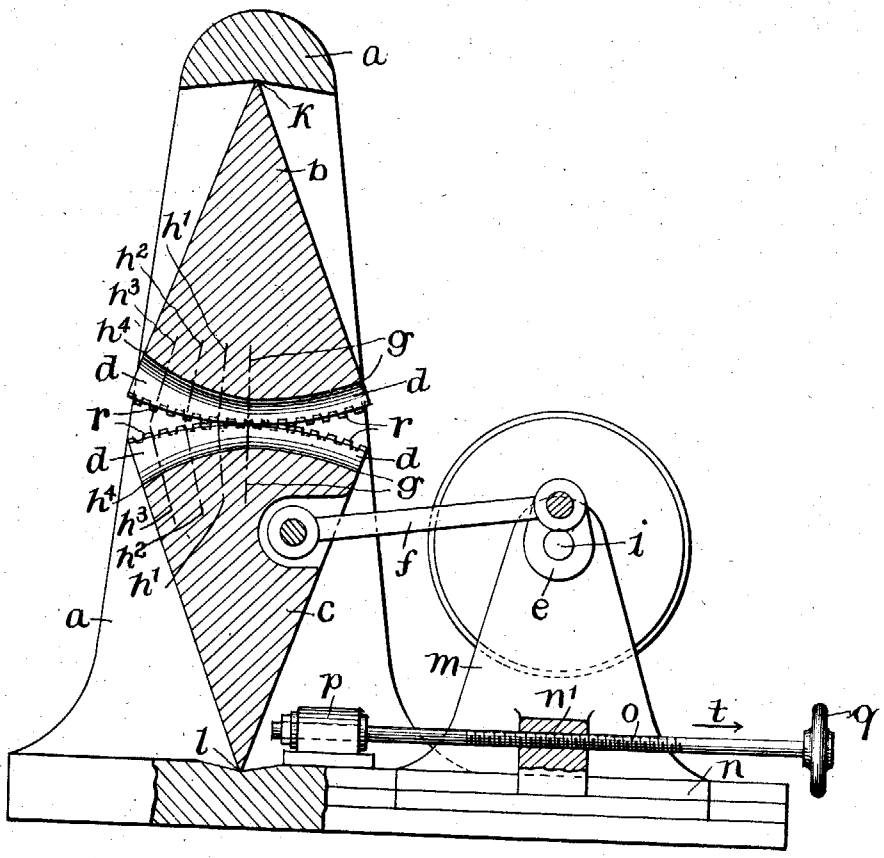
Figure 3:
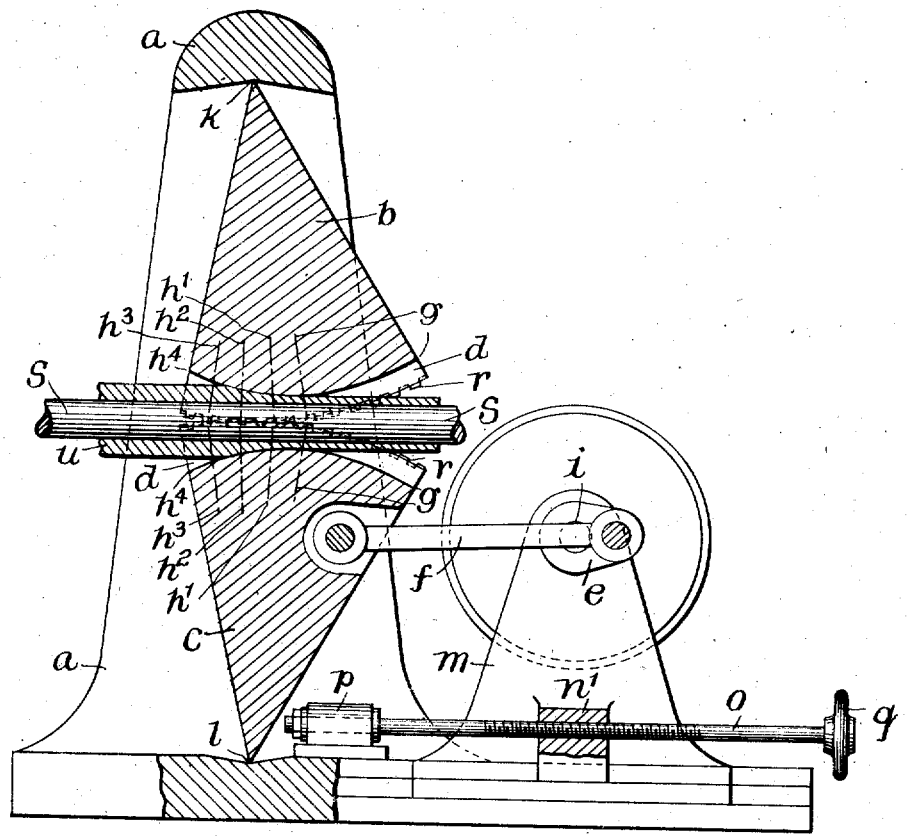

Figure 1 shows a vertical section of the machine. Fig. 2 is a front view of the same. Fig. 3 is a vertical section in another position with the piece to be forged within the same.

In the machine-frame $a$ two sector-formed parts $b$ and $c$ (commonly known in the art as "swaging-dies") are pivoted at $k$ and $l$, either by means of bolts or by means of the wedge-shaped edge of the same being situated within grooves provided in the frame $a$, as shown in the drawings. These two parts $b$ and $c$ are connected to each other by means of toothed bars $r$, so that in case one of the sector-formed pieces $b$ or $c$ is oscillated the other one oscillates in the same direction. To one of the parts $b$ and $c$ a connecting-rod $f$ is pivoted, which connecting-rod connects this part with a crank $e$, fixed to a shaft $i$. This shaft $i$ can be rotated in a convenient manner. Those surfaces of the parts $b$ and $c$ facing each other are provided with grooves $d$, the form of which corresponds to the form of the bars or tubes to be forged. The diameter of these grooves between the points $g$ $g$ is the same all over, while at $h'$ $h^2$ $h^3$ $h^4$ the diameter of the grooves gradually enlarges. Now in case the piece $u$, Fig. 3, to be forged is brought into these grooves during the time the pieces $b$ and $c$ are oscillated this piece $u$ will by the oscillation of the parts $b$ and $c$ be pressed into the form which the grooves have between the points $g$ $g$. It will be understood that in the space between the points $h^4$ and $h'$ the forging proper takes place, while in the space between the points $g$ $g$ the piece is flattened and smoothed. In case a pipe shall be forged a mandrel $s$ can be used, as shown in Fig. 3 of the drawings.

Now in order to attain that it is not necessary to change the parts $b$ and $c$ in case figured bars or tubes of different diameters, but of the same form, shall be forged the following arrangement is provided: The bearings $m$ for the crank-shaft $i$ are not rigidly attached to the frame $a$ of the machine, but are movable to and fro in guides $n$, provided in the foundation-plate of the same. The moving of the bearings is effected by means of a spindle $o$, journaled at $p$, the threads of which spindle engage in a nut $n'$, rigidly attached to the bearings $m$, so that by turning the spindle the bearing $m$ is moved. The turning of the spindle is effected by means of a hand-wheel $q$ or in any other convenient manner.

Now in case the bearing $m$ is moved in the direction of the arrow $t$, Fig. 1, the effect of the operation of the machine is changed on account of another part of the grooves $d$ coming in contact with the piece $u$ to be forged—that is to say, instead of that part of the grooves situated between the points $g$ $g$ coming in contact with the piece $u$ to be forged at the end of each return stroke the points $h^2$ or $h^3$, &c., of the same will be in contact with the piece $u$ at the end of each stroke, so that the part between the points $g$ $g$ does no more come in contact with the same at all. It is herewith attained that the piece to be forged is adapted to the forms which the grooves $d$ have on that point which comes in contact with the same at the end of the stroke. It further is attained by this arrangement that the diameter of the pieces to be forged can be gradually enlarged by moving the bearings during the forging operation, so that forging-pieces of a conical form can be manufactured and also such pieces the diameter of which alternately enlarges and diminishes. The cone shape of the forged piece depends upon the velocity with which the bearings $m$ are moved during the forging operation.

It is obvious that with the construction shown and described, with more particular reference to Fig. 3, the hollow piece $u$ to be forged (commonly known in the art as a "billet") while being forged into a pipe will always during the oscillatory movement of the dies $b$ and $c$ be moved by and with the dies in both directions and that through the billet the same endwise reciprocating motion will be transmitted to the mandrel also, and it is still further obvious that as the diameter is reduced it can be fed forward from time to time. Also it is obvious that the pipe so produced will be of the kind known in the art as "seamless."

Having thus fully described the nature of this invention, what I desire to secure by Letters Patent of the United States is—

1. In a forging-press, the combination of oscillating swages, provided with grooves the diameters of which increase in one direction, a fixed frame in which the swages are pivoted, a crank-shaft for oscillating the swages, a bearing in which the crank-shaft is journaled, and means for moving this bearing so as to change the distance between the crank-shaft and the pivots of the swages, substantially as described and for the purpose set forth.

2. In a seamless-pipe-forging machine, the combination of a mandrel capable of endwise reciprocation in both directions, and a pair of oscillatory swaging-dies which through the billet to be forged, impart to the mandrel both its forward and backward movements, each of said swages being provided with a tapering groove, said grooves tapering in the same direction, substantially as set forth.

3. In a metal-forging machine, a pair of oscillatory dies provided each with a tapering groove, said grooves tapering in the same direction, and of a length greater than that of each oscillatory die stroke or movement, and also provided with means for effecting their synchronous movement in both directions, in combination with suitable means for progressively changing the portions of the grooves which are in operative relationship with the article to be rolled, substantially as set forth.

In testimony whereof I have signed my name to this specification in the presence of two subscribing witnesses.

OTTO BRIEDE.

Witnesses:
GUSTAV ELSNER,
WILHELM KRUPPERS.